(No Model.)

H. J. REISS.
MEAT VENTILATING PIN.

No. 509,099. Patented Nov. 21, 1893.

WITNESSES:
Harry Willard Griffiths
Marion Hall

INVENTOR
Heinrich J. Reiss
BY
Jacques Raegener
ATTORNEYS.

THE NATIONAL LITHOGRAPHING COMPANY,
WASHINGTON, D. C.

UNITED STATES PATENT OFFICE.

HEINRICH J. REISS, OF NEW YORK, N. Y., ASSIGNOR OF ONE-HALF TO PHILIP A. NEBELING, OF SAME PLACE.

MEAT-VENTILATING PIN.

SPECIFICATION forming part of Letters Patent No. 509,099, dated November 21, 1893.

Application filed October 3, 1892. Serial No. 447,681. (No model.)

*To all whom it may concern:*

Be it known that I, HEINRICH J. REISS, a citizen of the United States, and a resident of the city, county, and State of New York, have invented certain new and useful Improvements in Meat-Ventilating Pins, of which the following is a specification.

In slaughtering cattle, the large hind-quarters of the same are transferred to and hung up in the refrigerating-building until they are required for being cut up into smaller pieces. During the hot season, the meat frequently deteriorates owing to the sudden action of the low temperature in the refrigerator-building on the same, as thereby the exterior surface of the meat is suddenly acted upon by cold and chilled air while the interior portions remain in warm condition. The meat thereby frequently turns "sour" and cannot be used as prime beef when cut up but has to be salted and utilized as a lower grade of beef. In order to overcome this deterioration incidental to the sudden change of temperature to which the meat is subjected, means were devised by which access could be given to the interior of the large quarters of meat, and my invention relates therefore to an improved ventilating-pin for beef and other meat which is inserted into the quarter along the round-bone and hip-joint of the same, so that when the meat is hung up in the refrigerator-building the cold air has access to the interior of the meat, while the heat in the same can readily escape, whereby the meat is retained in perfectly good condition.

The invention consists in a meat-ventilating pin made of conically tapering shape and with a fine round pointed end and provided with apertures for the passage of the air and with a hook or eye at the upper wider end by which the pin can be withdrawn from the meat when the same is to be cut up.

Figure 1:
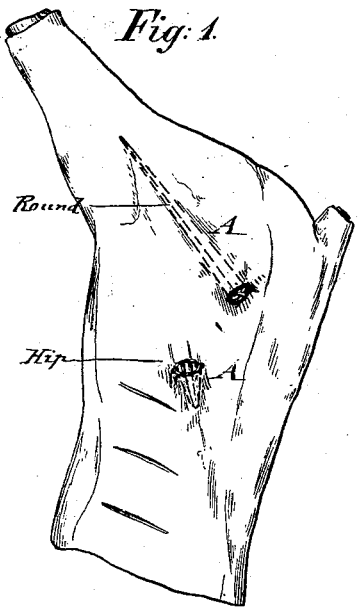
Figure 2:
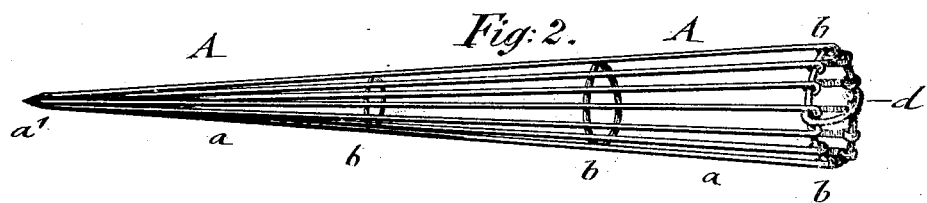
Figure 3:
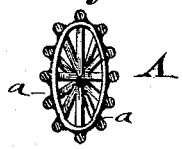
Figure 4:
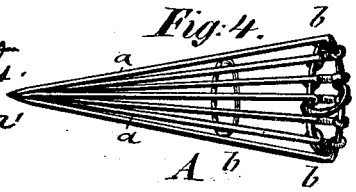

In the accompanying drawings, Figure 1 represents a perspective-view of a quarter of beef, showing two of my improved ventilating-pins inserted therein. Figs. 2 and 4 are side-elevations of my improved ventilating-pin, showing two different sizes of the same, and Fig. 3 is an end view of one of the pins.

Similar letters of reference indicate corresponding parts.

Referring to the drawings, A represents my improved ventilating-pin for beef and other meat, which is made in conical shape and preferably constructed of a series of longitudinal wires $a$ that converge from the wider round or oval end toward the round sharpened point $a'$ of the same. The longitudinal wires $a$ are reinforced by interior transverse supporting wires or stays $b$, which are soldered to the wires $a$, a similar stay connecting the upper ends of the wires $a$. A loop or eye $d$ extends across the end-stay $b$ and permits the convenient removing of the pin from the meat by means of a hook or otherwise. The pin tapers throughout the length of its body to a fine rounded point so that in inserting the pin the meat is not cut, but simply spread apart, the opening closing again on the withdrawal of the ventilating pin preparatory to cutting up the meat.

The meat is preserved by the ventilating action of the pin in prime condition without liability to deterioration by the sudden cooling off of the meat when transferred to the refrigerator. The pins are also adapted for use with meat that is shipped in so-called refrigerating cars or ships, as the cold air can act thereby in a more uniform and effective manner on the entire body of the meat.

Having thus described my invention, what I claim as new, and desire to secure by Letters Patent, is—

1. A meat ventilating pin composed of longitudinal wires converging from the wide upper end to a fine rounded point, substantially as described.

2. A meat ventilating pin consisting of longitudinal wires converging from the wide upper end to a point at the opposite end thereof, and a supporting stay connecting the upper ends of said longitudinal wires, substantially as described.

3. A conical shaped meat ventilating pin, consisting of longitudinal wires converging from the wide upper end to the point thereof, a supporting stay connecting the upper ends of said wires, and transverse supporting wires for reinforcing said longitudinal wires, substantially as described.

4. A conical shaped meat ventilating pin formed of longitudinal wires converging from the wide upper end to the point thereof, a supporting stay connecting the upper ends of said longitudinal wires, and a loop or eye connected to the upper supporting stay for removing the pin from the meat, substantially as described.

In testimony that I claim the foregoing as my invention I have signed my name in presence of two subscribing witnesses.

HEINRICH J. REISS.

Witnesses:
    PAUL GOEPEL,
    CHARLES SCHROEDER.